(12) United States Patent
Matsushita et al.

(10) Patent No.: US 7,071,593 B2
(45) Date of Patent: *Jul. 4, 2006

(54) CLAW-POLE TYPE STEPPING MOTOR

(75) Inventors: Kunitake Matsushita, Shizuoka-ken (JP); Takayuki Yamawaki, Shizuoka-ken (JP); Toshihiko Nagata, Shizuoka-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 46 days.

This patent is subject to a terminal disclaimer.

(21) Appl. No.: 10/929,184

(22) Filed: Aug. 30, 2004

(65) Prior Publication Data

US 2005/0046305 A1    Mar. 3, 2005

(30) Foreign Application Priority Data

Sep. 2, 2003  (JP) .............................. 2003-310329

(51) Int. Cl.
*H02K 1/12*   (2006.01)
*H02K 5/00*   (2006.01)
*H02K 3/46*   (2006.01)

(52) U.S. Cl. ..................... 310/257; 310/194; 310/49 R

(58) Field of Classification Search .............. 310/49 R, 310/254, 257, 43, 51, 194, 71
See application file for complete search history.

(56) References Cited

U.S. PATENT DOCUMENTS 2,922,932 A    1/1960  Glowacki et al.
4,047,061 A *  9/1977  Kilmer et al. .............. 310/164
5,523,634 A    6/1996  Takahashi et al.
5,912,518 A *  6/1999  Misik .......................... 310/71

FOREIGN PATENT DOCUMENTS

| DE | 2829945 | * | 1/1980 | .................. 310/194 |
| DE | 3211716 A1 | | 10/1983 | |
| EP | 1 394 922 A1 | | 3/2004 | |
| JP | 362077855 | * | 10/1987 | .................. 310/51 |
| JP | U-2-97883 | | 8/1990 | |
| JP | 10327570 | | 8/1998 | |
| JP | 2002-374662 | | 12/2002 | |
| JP | 2003-009497 | | 1/2003 | |
| JP | 2003-009501 | | 10/2003 | |

* cited by examiner

*Primary Examiner*—Tran Nguyen
(74) *Attorney, Agent, or Firm*—Wallenstein Wagner & Rockey, Ltd.

(57) ABSTRACT

A claw-pole type stepping motor comprises: a rotor assembly shaped substantially cylindrical, and having a center shaft; and a stator assembly composed of two cup-shaped stator units which are coupled to each other coaxially so as to axially sandwich the rotor assembly, and which each include a bobbin having a magnet wire wound therearound, and two pole tooth arrays magnetically connected to each other and shifted in phase from each other by an electrical angle of 180 degrees. In the motor, each stator unit further includes a cover ring which protects the magnet wire wound around the bobbin against resin injected when the stator unit is resin-molded for an integrated solid structure. The motor structured as described above can be successfully resin-molded so as to enable elimination of a motor case, thus achieving downsizing for the dimension of the eliminated motor case while maintaining a sufficient mechanical strength.

4 Claims, 10 Drawing Sheets

CLAW-POLE TYPE STEPPING MOTOR

This application claims priority from Japanese Application No. 2003-310329, filed Sep. 2, 2003 (incorporated by reference herein).

BACKGROUND OF THE INVENTION

1. Field of the Invention

The present invention relates to a structure of a claw-pole type stepping motor, and particularly to a structure thereof for achieving reduction in dimension and offering technical advantages.

2. Description of the Related Art

As various electronic devices are increasingly requested to be downsized, motors incorporated in the devices are also requested to be downsized. In a conventional claw-pole type stepping motor with an inner rotor, A-phase and B-phase driving coils are typically disposed so as to surround the outer circumference of a rotor. In such a claw-pole type stepping motor, the diameter of a rotor magnet is restricted by the inner diameter of a stator, so a motor with a smaller dimension is forced to have a rotor magnet with a smaller diameter thus resulting in significant deterioration in motor characteristic. This makes it difficult for a claw-pole type stepping motor with a small radial dimension to ensure performance characteristic required for poisoning control. In such a case, a brushless DC motor equipped with an encoder as a position detector must be used in place of a claw-pole type stepping motor, which inevitably pushes up production cost.

Under the aforementioned circumstances, Japanese Patent Application Laid-Open No. 2003-009497 discloses a motor structured such that driving coils are disposed so as to axially sandwich a rotor magnet. This motor structure helps reduction of its radial dimension, but since the motor is entirely covered by a case, the motor size has to be increased for the thickness of the case in all directional dimensions including the radial dimension. In order to reduce the radial dimension of this motor, the thickness of the case must be decreased. A case with a small thickness is technically difficult to fabricate, and also is inferior in mechanical strength, thus effort in reducing the thickness of the case has its limit. The case may be eliminated by, for example, resin-molding a stator for an integral structure, and such a solution is mentioned in the aforementioned Japanese Patent Application Laid-Open No. 2003-009497 (refer to Paragraph [0004]). However, the solution is negatively discussed therein, because when bobbins having respective exciting coils wound therearound are resin-molded integrally with yokes, it happens occasionally that the terminal wires of coils are broken due to molding pressure. Specifically, resin injected for molding gets in direct touch with the surface of magnet wires thereby deteriorating the coating of the magnet wires or even deforming and breaking the magnet wires.

SUMMARY OF THE INVENTION

The present invention has been made in light of the above circumstances, and it is an object of the present invention to overcome the difficulty in resin-molding a stator to thereby eliminate a motor case for a claw-pole type stepping motor in order to downsize its radial dimension while maintaining its mechanical strength.

In order to achieve the object, according to an aspect of the present invention, a claw-pole type stepping motor comprises: a rotor assembly shaped substantially cylindrical, and having a center shaft; and a stator assembly composed of two cup-shaped stator units which are coupled to each other coaxially so as to axially sandwich the rotor assembly, and which each include a bobbin having a magnet wire wound therearound for excitation, and two pole tooth arrays magnetically connected to each other and shifted in phase from each other by an electrical angle of 180 degrees. In the motor, each of the stator units further includes a cover ring which protects the magnet wire wound around the bobbin against resin injected when the stator unit is resin-molded for an integrated solid structure. Consequently, the difficulty with resin-molding the stator unit for an integrated solid structure is overcome, and a motor case for entirely covering a motor can be eliminated thus downsizing the motor with a sufficient mechanical strength ensured.

In the aspect of the present invention, the bobbin may include two flanges, the magnet wire may be wound between the two flanges, and the cover ring may be in contact with the two flanges such that the cover ring touches an outer circumference of at least one of the two flanges so as to protect the magnet wire wound between the two flanges against the resin injected. Consequently, the resin injected is prevented from getting to the magnet wire wound around the bobbin, and also the bobbin and the cover ring are held coaxial to each other when positioned.

In the aspect of the present invention, the bobbin may include a terminal block provided with terminals to conduct supply current to the magnet wire, and the cover ring may include a guide block which is at least partly in touch with the terminal block so as to protect the end portions of the magnet wire leading out to the terminals against the resin injected. Consequently, the bobbin is stopped from moving in the axial direction due to molding pressure at the time of resin-molding the stator unit for an integrated structure.

In the aspect of the present invention, the guide block of the cover ring may have a groove which allows the magnet wire to lead out to the terminals. Consequently, the stator unit is resin-molded with a guide passage ensured for leading out the magnet wire to the terminals.

Further, since the two stator units structured as described above are coupled to each other such that pins are inserted though respective holes formed on the stator units when resin-molded and riveted for fixation, a sufficient strength is provided for the motor assembled.

DETAILED DESCRIPTION OF THE PREFERRED EMBODIMENT

An embodiment of the present invention will hereinafter be described with reference to the accompanying drawings.

Figure 1:
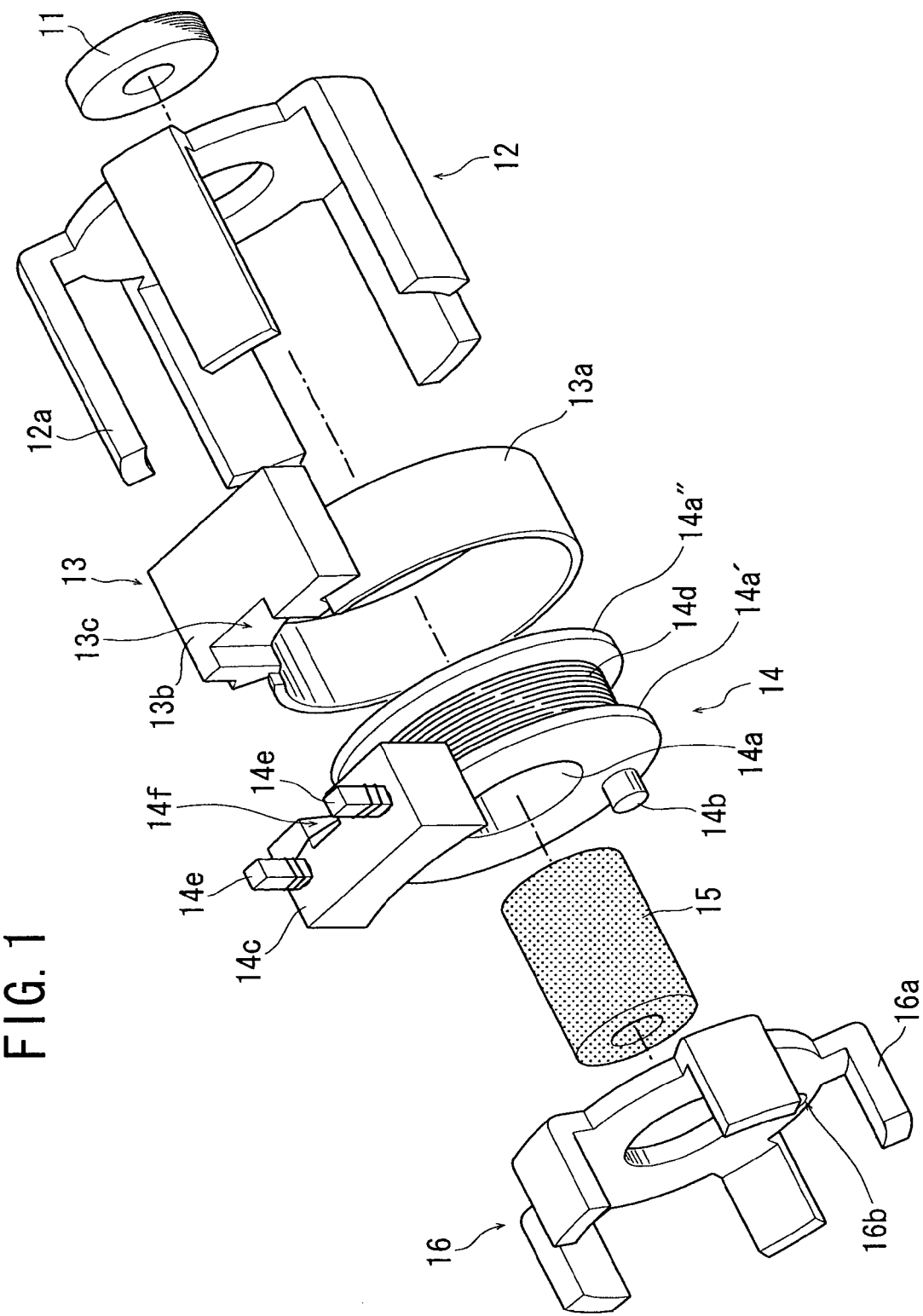
FIG. 1 is an exploded perspective view of one stator unit for a claw-pole type stepping motor according to an embodiment of the present invention.

A stepping motor according to the present invention comprises two stator units, specifically an A-phase stator unit and a B-phase stator unit arranged coaxially to each other. The B-phase stator unit is shown in FIG. 1 in an exploded manner so as to explain its constituent parts. The A-phase stator unit uses common constituent parts to the B-phase stator unit and an explanation thereof will be omitted. Since the A-phase and B-phase stator units use common constituent parts, the production cost of the parts can be reduced.

Referring to FIG. 1, the B-phase stator includes a bearing 11, a first stator yoke 12, a cover ring 13, a bobbin 14, a core 15, and a second stator yoke 16.

The bearing 11 is, for example, a sintered sleeve bearing to rotatably support a rotary shaft of a rotor assembly to be described later.

The first and second stator yokes 12 and 16 are punched out of a soft magnetic plate, such as a galvanized steel plate (SECC), a silicon steel plate, and an electromagnetic soft steel (SUY), have respective pole teeth 12a and 16a, are magnetically connected to each other via the core 15, and are coupled to each other with the respective pole teeth 12a and 16a shifted in phase from each other by an electrical angle of 180 degrees. The second stator yoke 16 has a pit 16b which engages with a boss 14b provided on the bobbin 14, whereby the second stator yoke 16 and the bobbin 14 are duly positioned with respect to each other in a circumferential direction for resin-molding process.

The core 15 is formed of a soft magnetic plate, such as an SECC, a silicon plate steel, and an SUY, and has a center hole for allowing the rotary shaft of the rotor assembly to pass through.

The bobbin 14 is formed of, for example, liquid crystal polymer, and made up of a body section 14a, flanges 14a' and 14a" sandwiching the body section 14a, and a terminal block 14c. A magnet wire 14d is wound around the body section 14a between the flanges 14a' and 14a", and terminal pins 14e for supplying current to the magnet wire 14d are attached to the terminal block 14c. The bobbin 14 is provided with the aforementioned boss 14b which fits engagingly into the aforementioned pit 16b of the second stator yoke 16 for positioning function as mentioned above. The mechanism for positioning the bobbin 14 with respect to the second stator yoke 16 may alternatively be structured such that the second stator yoke 16 is provided with a boss while the bobbin 14 is provided with a pit, or may be constituted by means of a positioning marker, such as a notch, provided appropriately. The terminal block 14c has a groove 14f which functions mainly as a mechanism for hooking the magnet wire 14d when the magnet wire 14d is wound around the bobbin 14.

The cover ring 13 is formed of, for example, liquid crystal polymer, made up of a body section 13a and a guide block 13b, and protects the magnet wire 14d wound around the bobbin 14 against resin injected for molding the B-phase stator unit for integrated structure. The guide block 13b has a groove 13c which allows the terminal ends of the magnet wire 14d wound around the bobbin 14 to lead out to the terminal pins 14e when the cover ring 13 is attached onto the bobbin 14 thereby bringing the guide block 13b in contact with the terminal block 14c.

Figure 2:
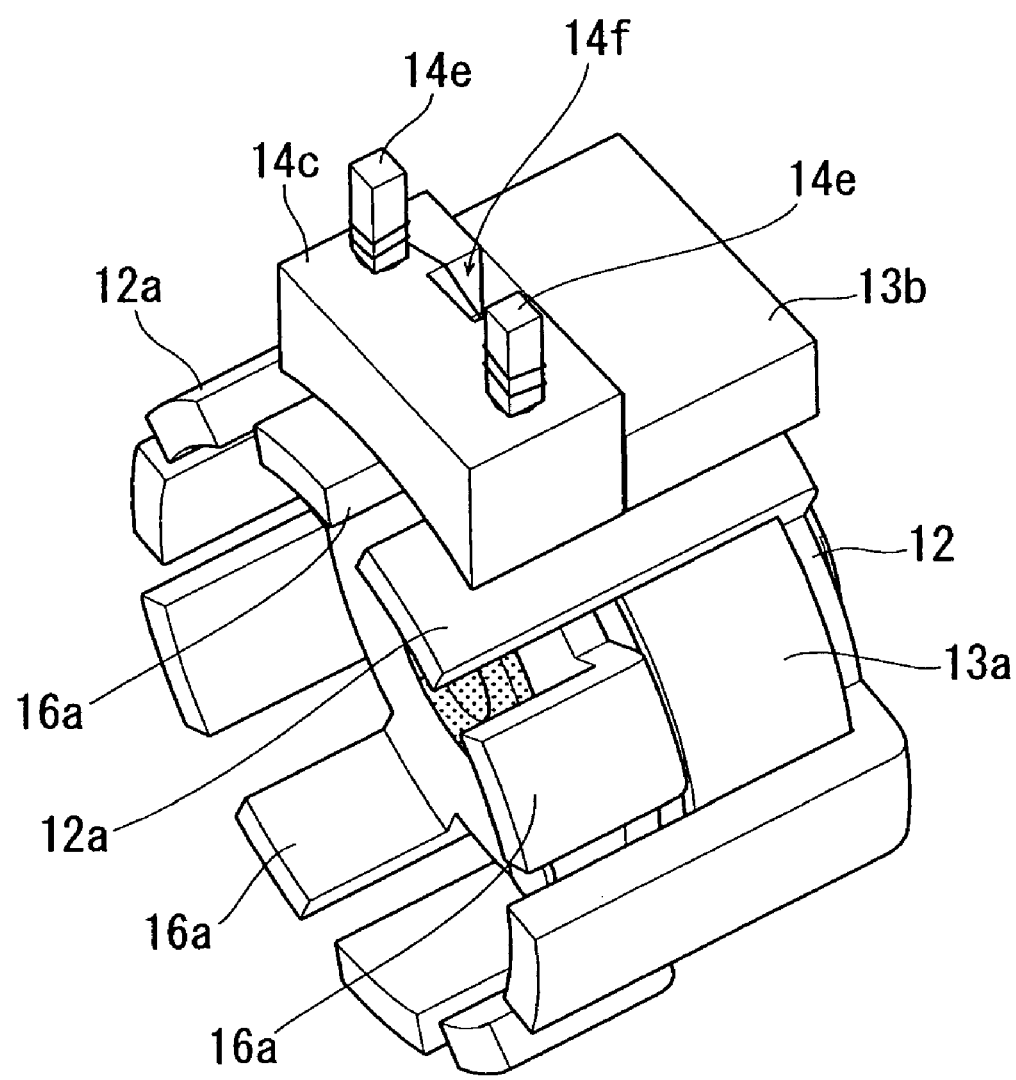
FIG. 2 is a perspective view of a framed state of the one stator unit shown in FIG. 1.

The above-described constituent parts are put together in an axial direction in reference-numerical order, and the B-phase stator unit is framed as shown in FIG. 2. When the B-phase stator unit is duly framed, the guide block 13b of the cover ring 13 and the terminal block 14c of the bobbin 14 are engagingly sandwiched between two adjacent pole teeth out of the pole teeth 12a of the first stator yoke 12, whereby the cover ring 13 and the bobbin 14 can be duly positioned with respect to the first stator yoke 12 in the circumferential direction. And, the bobbin 14 can be duly positioned with respect to the second stator yoke 16 in the circumferential direction by means of the boss 14b of the bobbin 14 engagingly fitting into the pit 16b of the second stator yoke 16 as described above. The B-phase stator units framed as shown in FIG. 2 is resin-molded by, for example, injection molding to be integrated for solidification.

Figure 3:
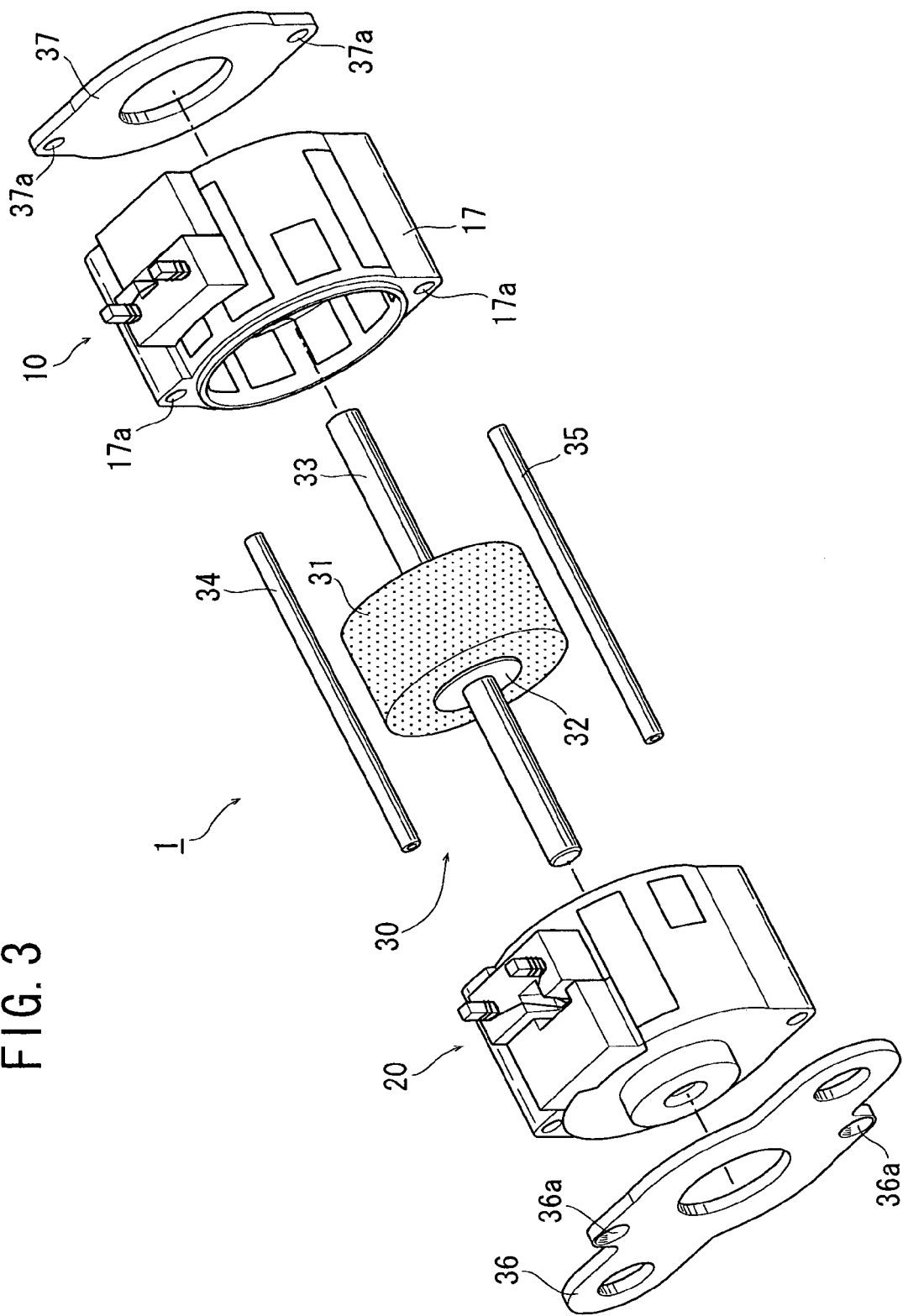
FIG. 3 is an exploded perspective view of the claw-pole type stepping motor according to the embodiment of the present invention.

Referring to FIG. 3, a claw-pole type stepping motor 1 according to the present invention comprises the above-described B-phase stator unit 10 resin-molded, the aforementioned A-phase stator unit 20 resin-molded, a rotor assembly 30, a front plate 36, a rear plate 37, and pins 34 and 35 for securely holding together the parts in place.

The B-phase stator unit 10 is resin-molded as described above so as to have a resin portion 17, and holes 17a for passing the pins 34 and 35 are formed in the resin portion 17 at the time of resin-molding. The A-phase stator unit 20 is structured in the same way as the B-phase stator unit 10 with only difference found in the location of the holes for passing the pins 34 and 35, and therefore a detailed explanation thereof is omitted.

The rotor assembly 30 includes a rotor magnet 31 constituted by, for example, a rare-earth cylindrical magnet and having a outer diameter of some 5 mm, and a rotary shaft 33 formed of, for example, stainless steel, and washers 32 formed of, for example, stainless steel are put on the rotary shaft 33.

The front plate 36, which may be formed of a magnetic or nonmagnetic material, has holes 36a for passing the pins 34 and 35, and the pins 34 and 35 are, for example, riveted to be fixed at the holes 36a.

The rear plate 37, which may also be formed of a magnetic or nonmagnetic material, has holes 37a for passing the pins 34 and 35, and the pins 34 and 35 are, for example, riveted to be fixed at the holes 37a.

The motor 1 is assembled such that the constituent parts described above are put together in an axial direction in reference-numerical order. In the assembling process, the pins 34 and 35 are inserted through respective holes 36a of the front plate 36, the A-phase stator unit 20, the B-phase stator unit 10, and the rear plate 37, and have their respective both ends, for example, riveted for fixation, whereby the parts are duly and fixedly positioned with respect to one another in the circumferential direction.

Figure 4:
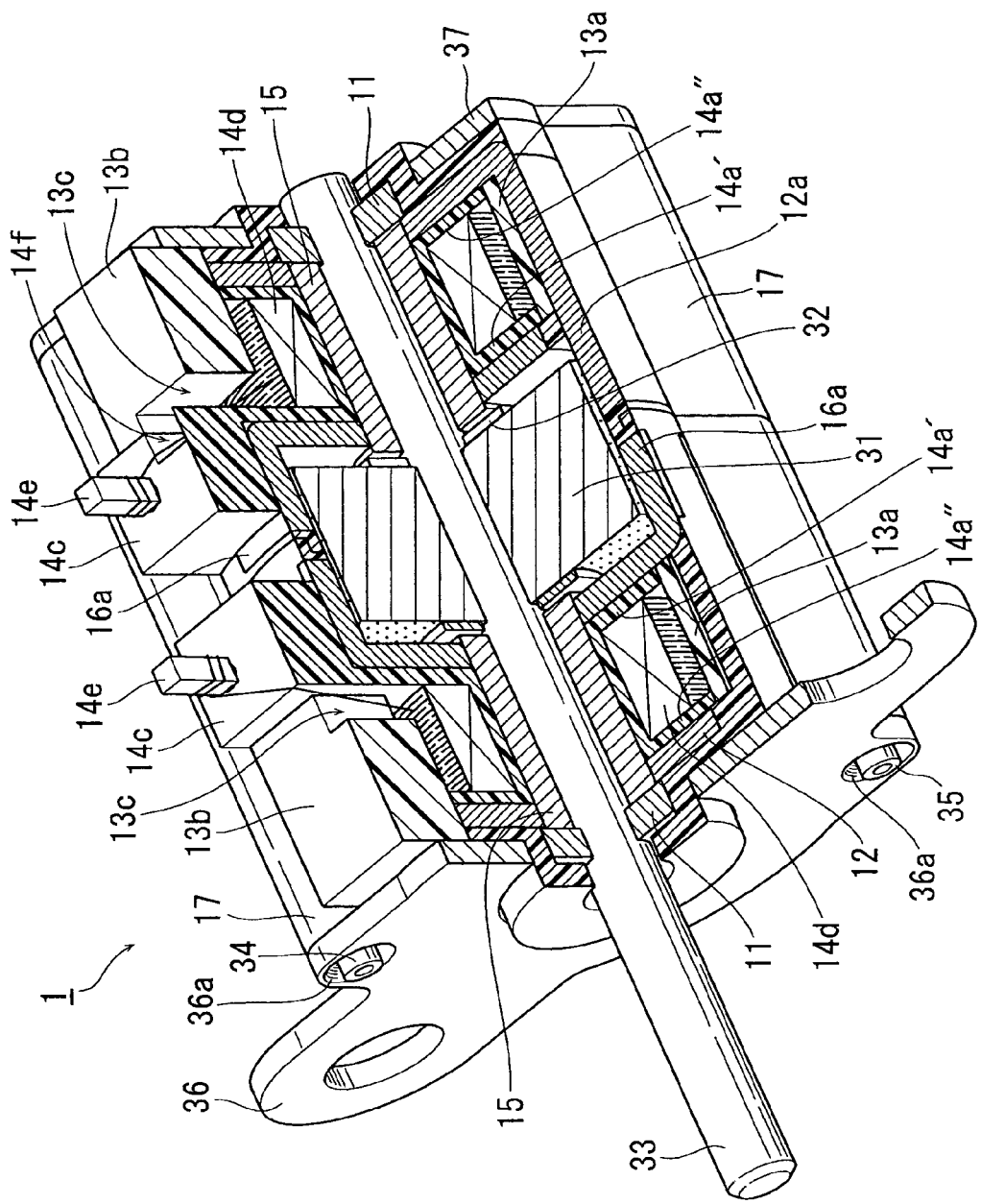
FIG. 4 is a sectioned perspective view of the motor shown in FIG. 3.

Referring now to FIG. 4, the motor 1 has the rotary shaft 33 disposed at the center, and the rotor magnet 31 is mounted on the rotary shaft 33. The body section 13a of the cover ring 13 is disposed so as to be in contact with the flanges 14a' and 14a" of the bobbin 14 which sandwich the magnet wire 14d wound around the bobbin 14, and prevents injected resin from getting to the magnet wire 14d. This way, the magnet wire 14d is protected against the injected resin and therefore prevented from deteriorating or breaking when the stator units are resin-molded for integration. The cover ring 13 is put on the bobbin 14 preferably with the body section 13a set in touch with the outer circumference of at least one of the flanges 14a' and 14a", so that the cover ring 13 is held coaxial to the bobbin 14. Also, the guide block 13b of the cover ring 13 is at least partly in touch with the terminal block 14c of the bobbin 14, whereby the injected resin is prevented from getting to the end portions of the magnet wire 14d leading out to the terminal pins 14e, and whereby the terminal block 14c is stopped from moving in the axial direction due to molding pressure at the process of resin-molding. And, it is realized from FIG. 4 that the groove 13c provided at the guide block 13b allows the magnet wire 14d wound around the bobbin 14 to lead out to the terminal pins 14e.

Figure 5:
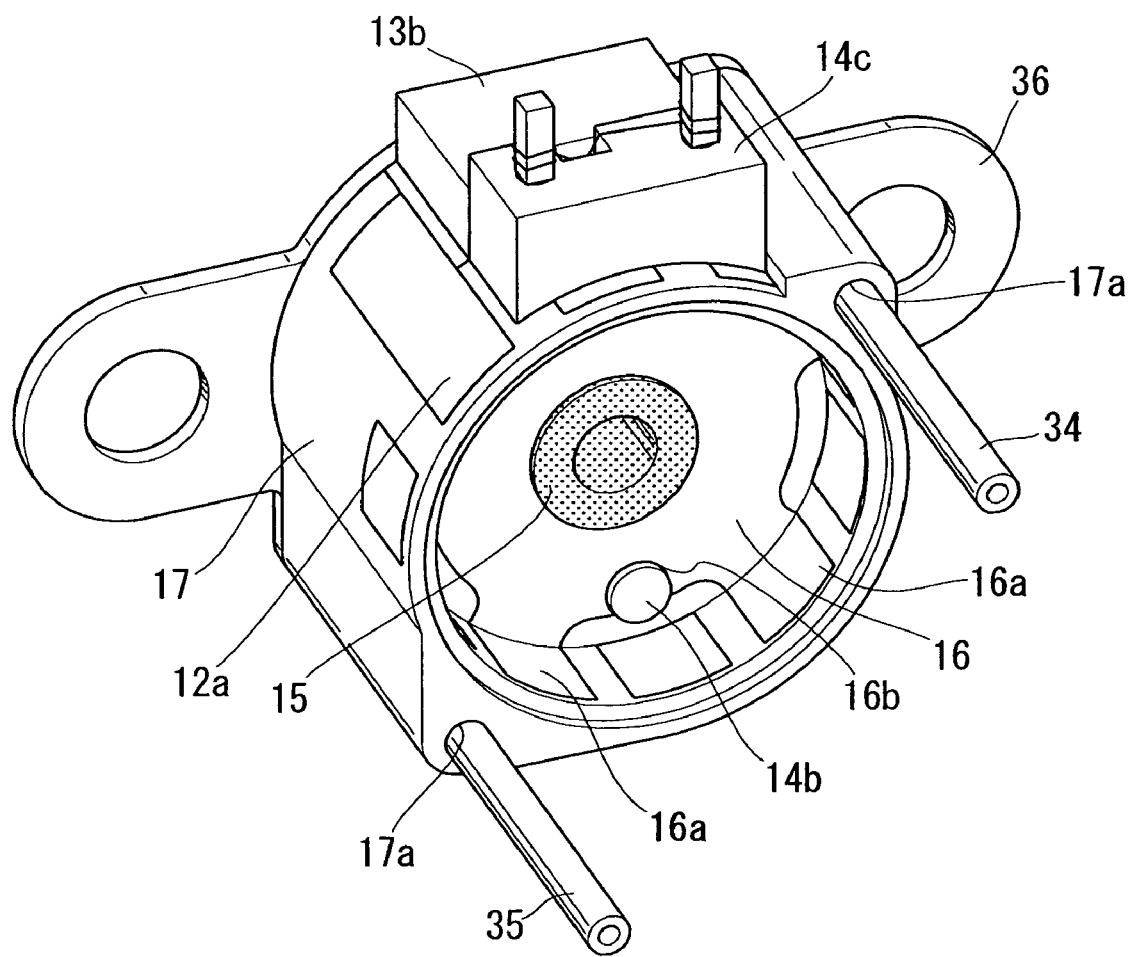
FIG. 5 is a perspective view of the motor of FIG. 4 seen from a rear side, omitting a rear plate 37, a B-phase stator unit 10, a rotor assembly 30, and washers 32.

Referring to FIG. 5, the motor 1 shown in FIG. 4 is perspectively viewed from its rear side, omitting the rear plate 37, the B-phase stator unit 10, the rotor assembly 30, and the washers 32. The boss 14b of the bobbin 14 fits engagingly into the pit 16b of the second stator yoke 16 so as to fixedly position the bobbin 14 with respect to the second stator yoke 16 in the circumferential direction. The positioning may alternatively be implemented, for example, such that a notch provided on the second stator yoke 16 in place of the pit 16b is set to a predetermined marker at the process of resin-molding.

Figure 6:
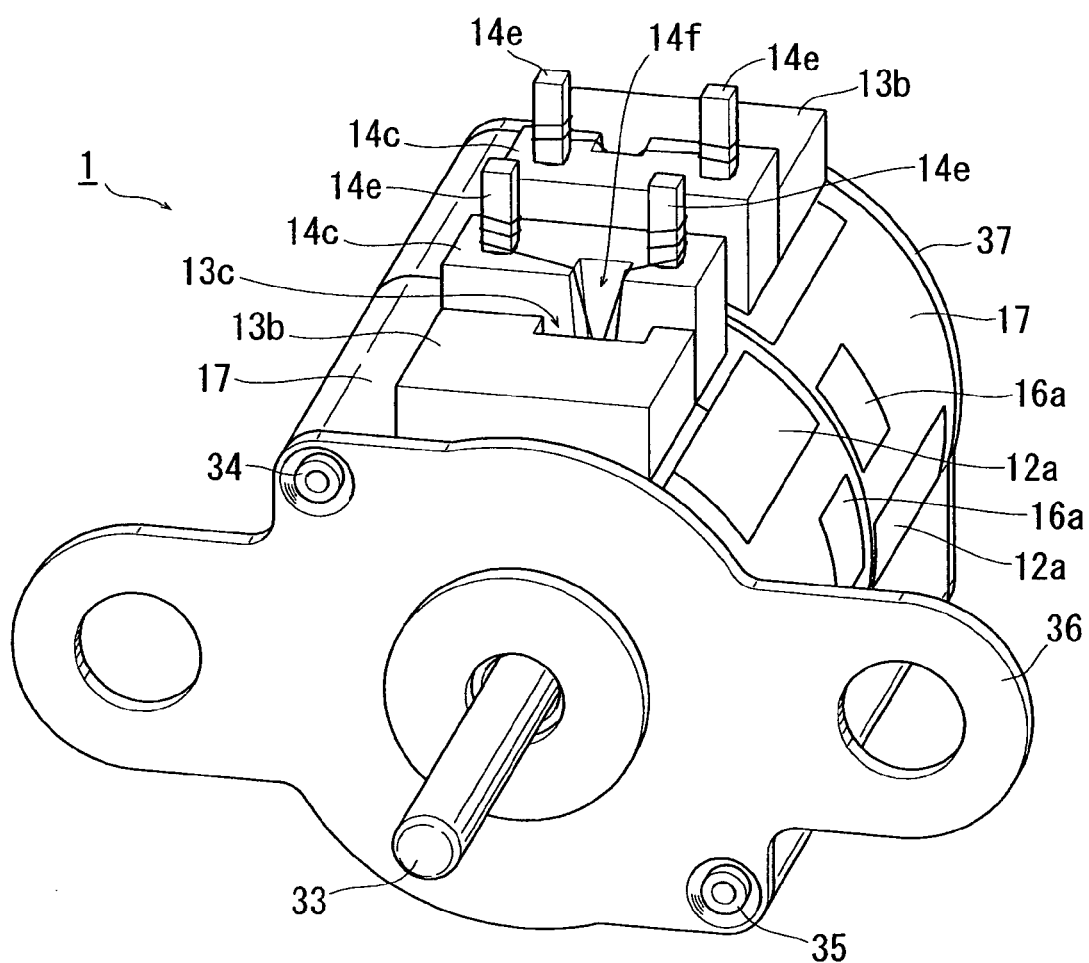
FIG. 6 is a perspective view of the motor of FIG. 4 seen from a front side.
Figure 7:
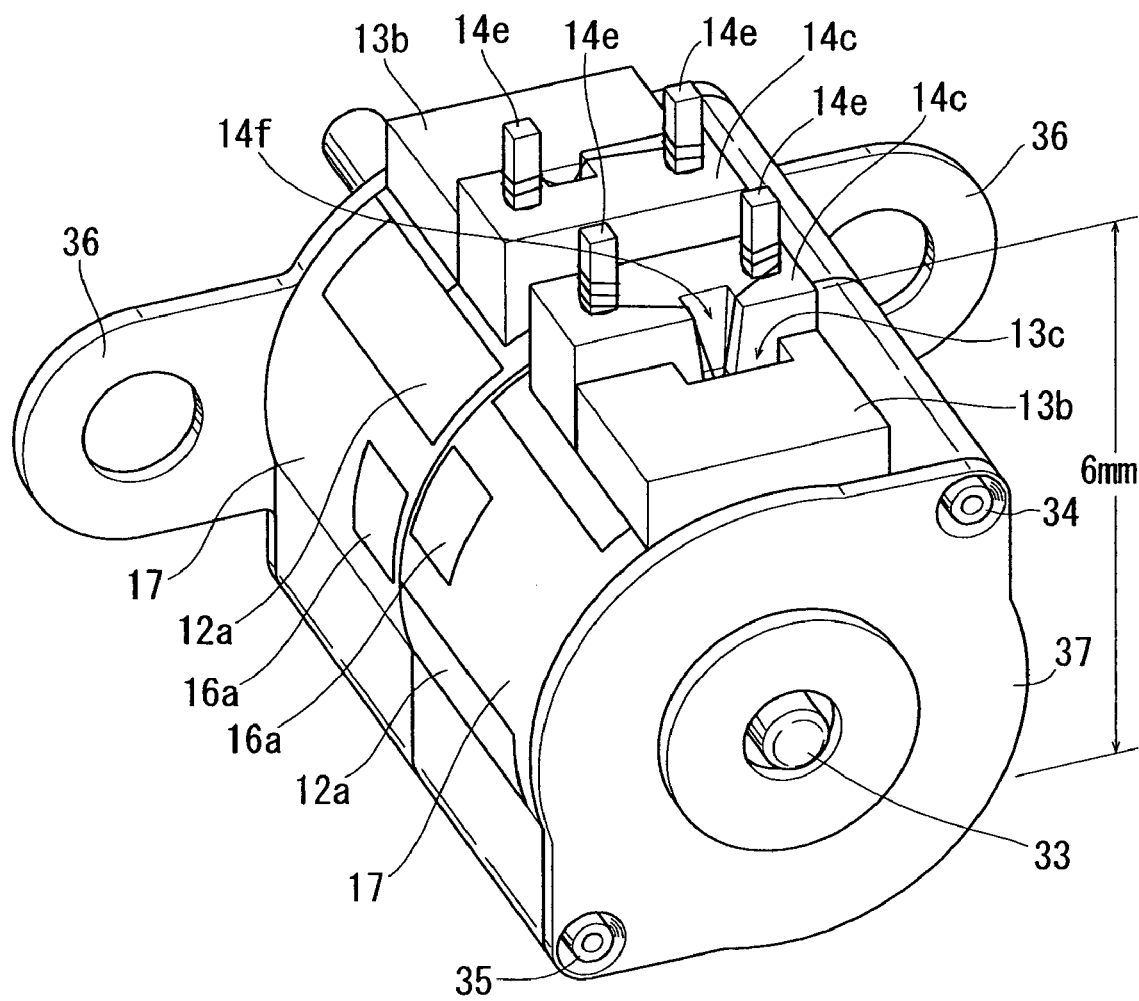
FIG. 7 is a perspective view of the motor of FIG. 4 seen from the rear side.

Referring to FIGS. 6 and 7, it is known that the groove 14f, which is formed on the terminal block 14c of the bobbin 14, and which is intended to serve as a hooking mechanism for the magnet wire 14d at the process of winding, works, together with the groove 13c of the guide block 13b of the cover ring 13, also as a guide passage for the end portions of the magnet wire 14d leading to the terminal pins 14e, thus the magnet wire 14d is surely and reliably allowed to lead out to the terminal pins 14e. FIG. 7 shows that the motor 1 structured according to the present invention is downsized so as to measure as small as 6 mm in height.

Figure 8A:
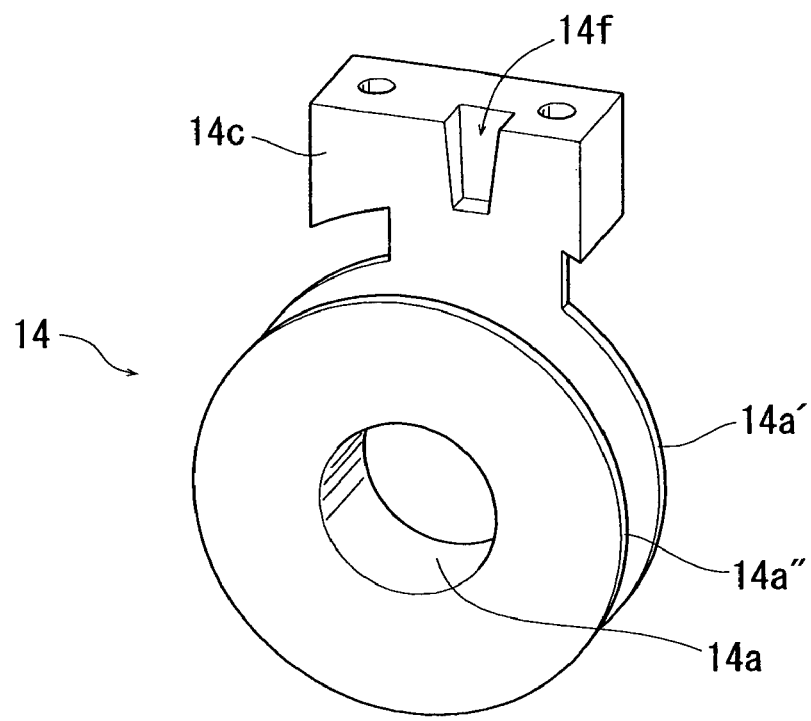
FIGS. 8A and 8B are perspective views of a bobbin 14 shown in FIG. 1 seen from a side opposite to a side as seen in FIG. 1, wherein FIG. 8A omits a magnet wire 14d and terminal pins 14e.
Figure 8B:
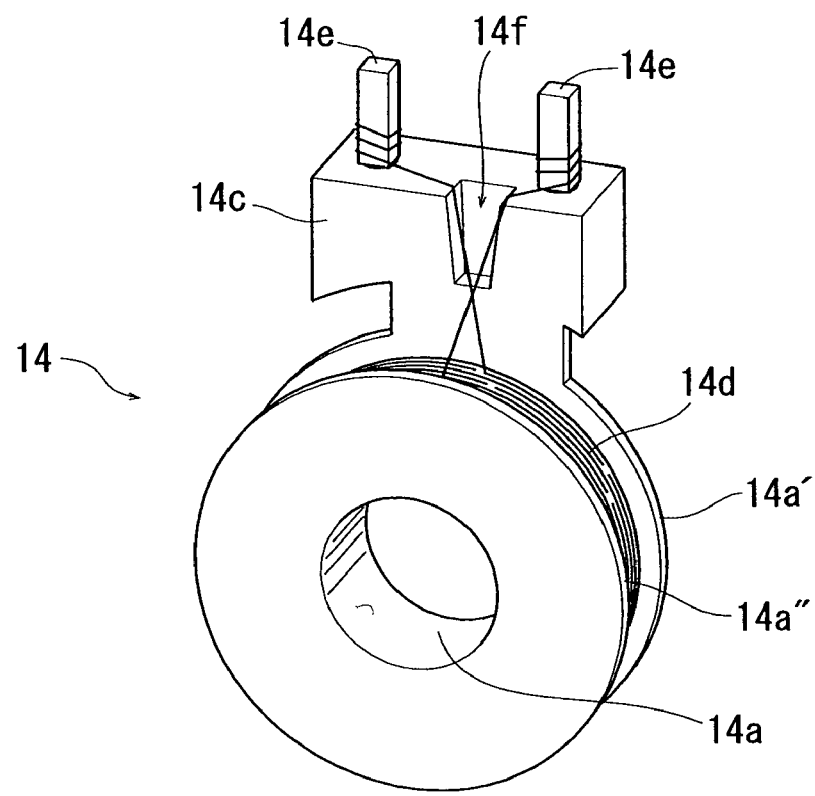

Referring to FIGS. 8A and 8B, the bridging portion between the flange 14a' and the terminal block 14c on the bobbin 14 has a width adapted to fit engagingly between two adjacent pole teeth of the pole teeth 12a of the first stator yoke 12 thereby fixedly positioning the bobbin 14 with respect to the first stator yoke 12 in the circumferential direction.

Figure 9:
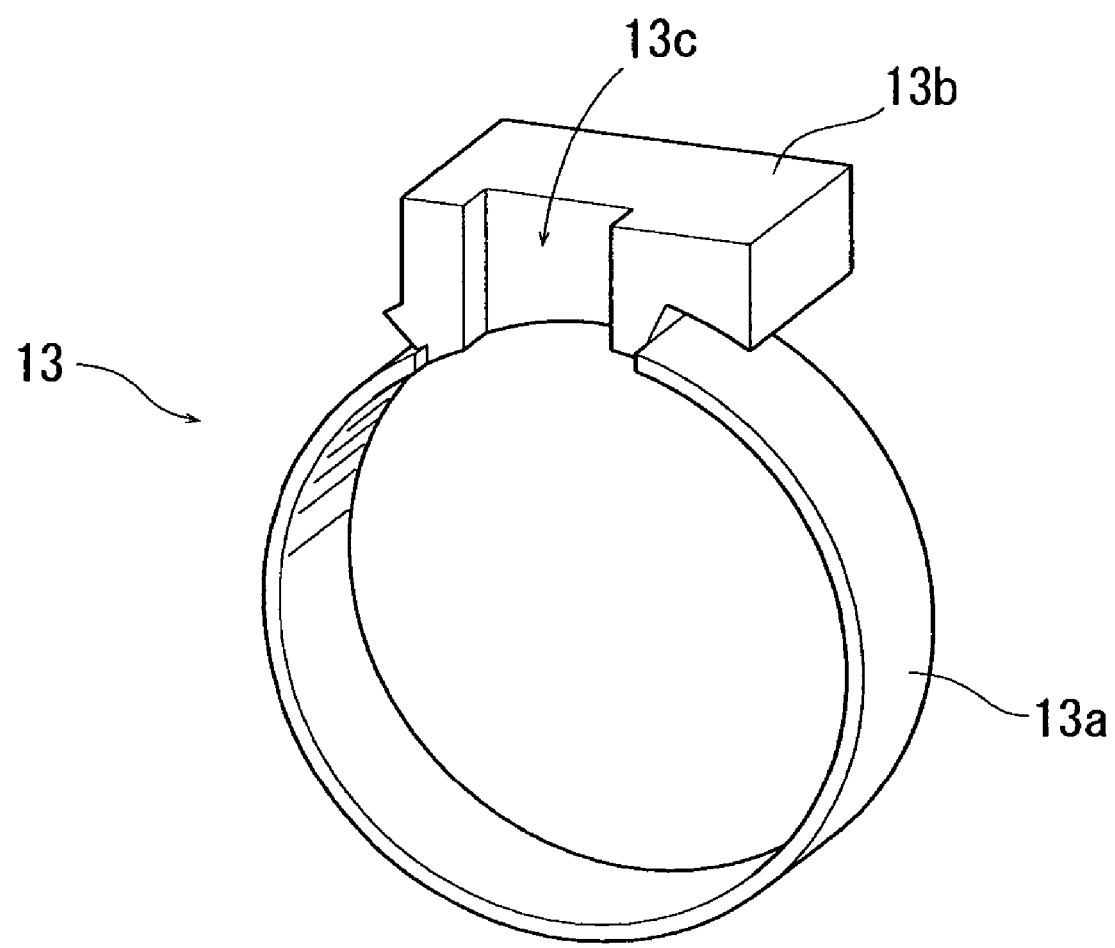
FIG. 9 is a perspective view of a cover ring 13 shown in FIG. 1.

Referring to FIG. 9, the bridging portion between the body section 13a and the guide block 13b on the ring cover 13 has a width adapted to fit engagingly between the two adjacent pole teeth of the pole teeth 12a of the first stator yoke 12 thereby fixedly positioning the cover ring 13 with respect to the first stator yoke 12 in the circumferential direction.

Figure 10A:
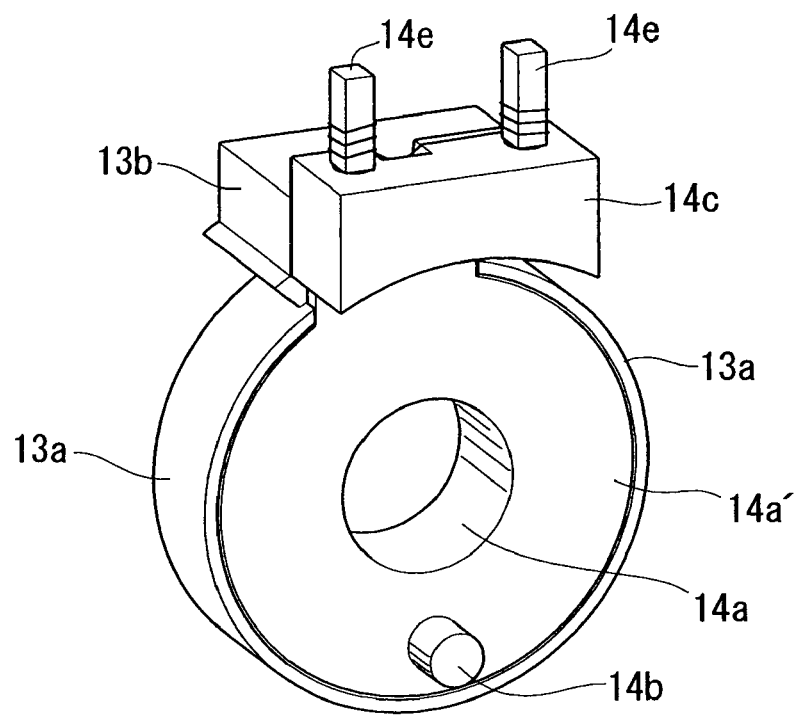
FIGS. 10A and 10B are perspective views of the bobbin 14 of FIG. 8B with the cover ring 13 of FIG. 9 put thereon, seen from both sides, respectively.
Figure 10B:
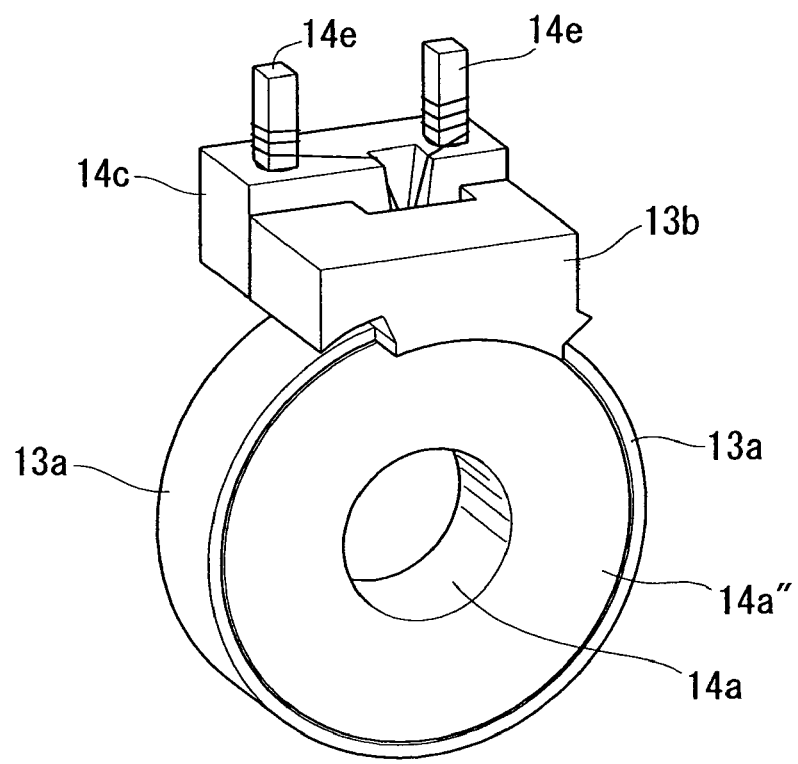

Referring to FIGS. 10A and 10B, the cover ring 13 is put on the bobbin 14 such that the body section 13a covers the outer circumferences of the flanges 14a' and 14a", whereby the magnet wire 14d wound around the body section 14a between the flanges 14a' and 14a" is protected.

In the above description of the embodiment according to the present invention, a conventionally required motor case for entirely covering a motor is eliminated thereby achieving downsizing, but if the motor cover is eliminated with the motor size remaining unchanged, then the dimension of its components can be increased thereby enhancing its motor characteristic. Also, the motor according to the present invention may have a round, rectangular or otherwise configured radial cross section according to a housing space configuration.

While the present invention has been illustrated and explained with respect to a specific embodiment thereof, it is to be understood that the present invention is by no means limited thereto but encompasses all changes and modifications that will become possible within the scope of the appended claims.

What is claimed is:

1. A claw-pole stepping motor, comprising:
   a rotor assembly comprising a cylindrical magnet and a center shaft; and
   a stator assembly comprising first and second cup-shaped units, each stator unit comprising:
      a bobbin having a magnet wire wound therearound for excitation;
      two pole tooth arrays magnetically connected to each other and shifted in phase from each other by an electrical angle of 180 degrees; and,
      a cover ring provided to protect the magnet wire wound around the bobbin against resin injected when the stator unit is resin-molded for an integrated solid structure;
   wherein each of the stator units is coaxially coupled one to the other such that the respective bobbins of each of the stator units having magnet wires wound therearound axially sandwich the magnet of the rotor assembly.

2. A claw-pole type stepping motor according to claim 1, wherein the bobbin includes two flanges, the magnet wire is wound between the two flanges, and the cover ring is in contact with the two flanges such that the cover ring touches an outer circumference of at least one of the two flanges so as to protect the magnet wire wound between the two flanges against the resin injected.

3. A claw-pole type stepping motor according to claim 1, wherein the bobbin includes a terminal block provided with terminals to conduct supply current to the magnet wire, and the cover ring includes a guide block which is at least partly in touch with the terminal block so as to protect end portions of the magnet wire leading out to the terminals against the resin injected.

4. A claw-pole type stepping motor according to claim 3, wherein the guide block of the cover ring has a groove which allows the magnet wire to lead out to the terminals.

* * * * *